(12) United States Patent
Ojha et al.

(10) Patent No.: US 9,893,929 B2
(45) Date of Patent: Feb. 13, 2018

(54) PROTECTION SWITCHING METHOD AND SYSTEM FOR A MULTI-ROOTED POINT-TO-MULTI-POINT SERVICE IN A PROVIDER BACKBONE BRIDGE (PBB) NETWORK

(71) Applicant: TEJAS NETWORKS LIMITED, Bangalore, Karnataka (IN)

(72) Inventors: Somnath Ojha, Maharashtra (IN); Vinod Kumar Madaiah, Karnataka (IN)

(*) Notice: Subject to any disclaimer, the term of this patent is extended or adjusted under 35 U.S.C. 154(b) by 229 days.

(21) Appl. No.: 13/626,417

(22) Filed: Sep. 25, 2012

(65) Prior Publication Data
US 2013/0077473 A1 Mar. 28, 2013

(30) Foreign Application Priority Data
Sep. 26, 2011 (IN) ............................. 3325/CHE/2011

(51) Int. Cl.
*G01R 31/08* (2006.01)
*H04L 12/24* (2006.01)
*H04L 12/46* (2006.01)
*H04L 12/707* (2013.01)
*H04L 12/703* (2013.01)

(52) U.S. Cl.
CPC ........ *H04L 41/0668* (2013.01); *H04L 12/462* (2013.01); *H04L 12/4662* (2013.01); *H04L 41/0663* (2013.01); *H04L 45/22* (2013.01); *H04L 45/28* (2013.01)

(58) Field of Classification Search
CPC ................................ H04L 45/28; H04L 45/22
USPC ........................................... 370/221, 242, 390
See application file for complete search history.

(56) References Cited

U.S. PATENT DOCUMENTS

| | | | |
|---|---|---|---|
| 2009/0175176 A1* | 7/2009 | Mohan | 370/244 |
| 2010/0020797 A1* | 1/2010 | Casey et al. | 370/390 |
| 2010/0208593 A1* | 8/2010 | Soon et al. | 370/242 |
| 2010/0260197 A1* | 10/2010 | Martin et al. | 370/408 |
| 2010/0271938 A1* | 10/2010 | Mutoh | H04L 12/4604 370/228 |

* cited by examiner

Primary Examiner — Mark Rinehart
Assistant Examiner — Angel Brockman
(74) Attorney, Agent, or Firm — Oliff PLC (57) ABSTRACT

The present invention relates to a protection switching method and system for a Multi-Rooted Point-to-Multi-point Service in a Provider Backbone Bridge (PBB) network. In one embodiment, this is accomplished by assigning at least one communication device as Root node, a plurality of intermediate nodes and Leaf nodes, receiving, on at least one of the edge nodes (i.e. Root or leaf), the data packets from a client network interfacing with the PBB network, configuring all the communication edge devices to create a MAC-in-MAC data packet from the received data packet, configuring the Root node to add ISID R and leaf nodes to add ISID L in the I-tag of MAC-in-MAC data packets, determining a fault, if integrity check messages are not received in a predetermined time period between the Root node and the Leaf Nodes and switching the traffic by changing the designated backbone destination MAC address of the MAC-in-MAC data packets from the present root node MAC address to other available superior root node MAC address; wherein switching is performed when integrity failure is detected, or upon network operator request.

10 Claims, 4 Drawing Sheets

PROTECTION SWITCHING METHOD AND SYSTEM FOR A MULTI-ROOTED POINT-TO-MULTI-POINT SERVICE IN A PROVIDER BACKBONE BRIDGE (PBB) NETWORK

This application claims benefit of Serial No. 3325/CHE/2011, filed 26 Sep. 2011 in India and which application is incorporated herein by reference. To the extent appropriate, a claim of priority is made to the above disclosed application.

FIELD OF THE INVENTION

The invention relates to Ethernet services in a communication network. More specifically, the present invention is concerned with a protection switching method and system in Ethernet Multi-rooted Point-to-Multipoint Service over Provider Backbone Bridge (PBB) Network.

BACKGROUND OF THE INVENTION

The Metro Ethernet Forum (MEF) develops technical specifications and implementation agreements to promote interoperability and deployment of Carrier Ethernet worldwide. MEF Technical Specification 6.1 defines a particular Ethernet service type called Ethernet-Tree (or E-Tree), which is based on a Rooted-Multipoint Ethernet Virtual Connection (EVC). In a simple form, an E-Tree Service type is a point to multi-point service over Ethernet technology and may provide a single root for multiple leaf user network interfaces (UNIs) or nodes. Each leaf UNI can exchange data with only the root UNI. E-Tree service may be useful for Internet access or video-over-IP applications, such as multicast/broadcast packet video.

A P2MP (point to multi-point) has exactly one root and at least two leaves. In P2MP the root communicates with at least one leaf and further a leaf cannot communicate with any other leaf directly but may do so via the root if allowed by the operator. Each root is sourcing unicast or multicast traffic to the leaves. A leaf can only communicate with its root by sending unicast frames to the root. If a root fails then none of the leaf will receive any traffic. For providing resiliency in scenarios where failure of root is inevitable, additional roots are provided wherein leaf switches from one root to another root when the original root is not reachable. This resilient mechanism is called as Multi-rooted P2MP (MRP2MP).

Figure 2:
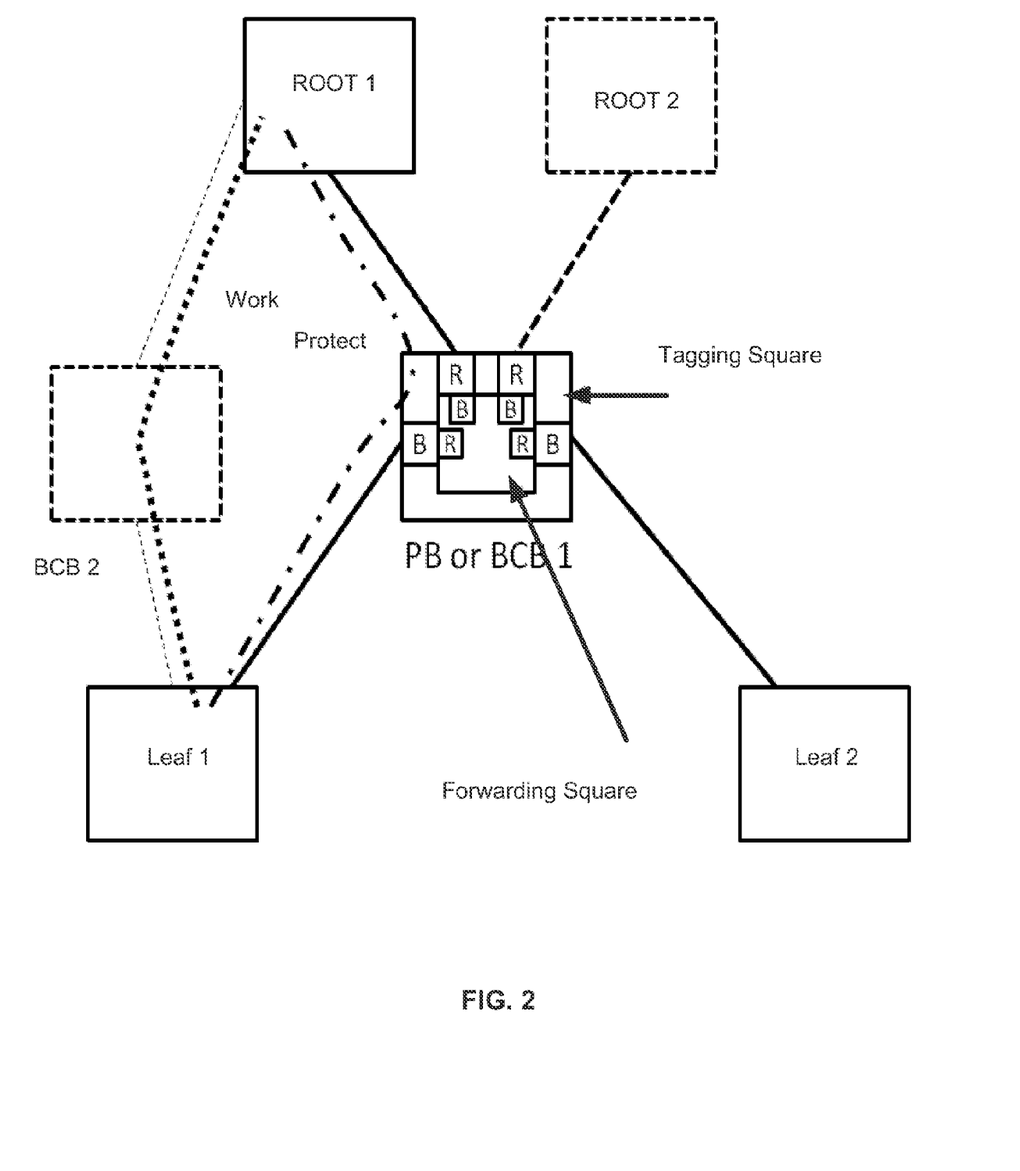
FIG. 2 shows working of a prior art system in a Providers network, Provider Backbone Bridge (PBB) Network and Provider Backbone Bridge (PBB)—Traffic Engineering (TE).

In PBN (provider bridging network) MRP2MP is not possible because the edge nodes or equipments or Provider Edge Bridges (PEB) do not have feature of switching from one destination address to another destination address. PEBs can only forward the traffic to the next bridge; they cannot change the destination address of the Ethernet Frame. PBN can support only P2MP service. Further, for P2MP service, a PBN will need at least two VLAN IDs (see FIG. 2): one for traffic from leaves towards the root 1 and another for traffic from root 1 towards the leaves. In the FIG. 2, the VLAN ID (as shown) provisioning required in the provider bridge (PB) which is connecting root 1, leaf 1 and leaf 2. Sometimes this provider bridge is also called as BCB. The BCB has two mechanisms: one for tagging the incoming frame at the ingress port (this is represented by small squares attached to the outer square; the letters inside the small square are VLAN IDs as shown in FIG. 2) and one for forwarding the frame through the correct egress port (this is represented by small squares attached to the inner square; the letters inside the small square are VLAN IDs as shown in FIG. 2). When leaf 1 sends a frame, BCB will tag the frame with VLAN ID, say B, at the tagging square. After tagging, the frame enters the forwarding square. In the forwarding square frames tagged with VLAN ID B is configured to be forwarded towards root 1. Notice that tagging and forwarding is so configured that communication between leaves is prevented. When root 1 sends a frame, either unicast or multicast, BCB will tag the frame with VLAN ID, say R, at the tagging square. After tagging, the frame enters the forwarding square. In the forwarding square frames tagged with VLAN ID R is configured to be forwarded towards leaves. If unicast frame is to be forwarded then frame is forwarded towards the leaf matching the destination address in the frame. If multicast frame is to be forwarded then frame is forwarded towards both leaf 1 and leaf 2. Notice that tagging and forwarding is so configured that root 1 can send both unicast and multicast towards the leaf. As this tagging and forwarding is based on VLAN IDs, service failure resulting from failure of root 1 cannot be protected. Further, we need two VLAN IDs for P2MP to work. VLAN ID is a priced resource in networking and any mechanism targeted towards saving the VLAN is going to be very useful. Moreover, switching from one root to another root is not possible because PEB or any client device does not have method to change the destination address at layer 2.

In PBB (provider backbone bridging), the edge bridges are called as backbone edge bridge (BEB). In the FIG. 2 (as shown) three BEBs: root 1, leaf 1 and leaf 2. In PBB, a P2MP is provisioned as follows: Traffic entering the BEBs are marked with an ISID picked from a pool of P2MP ISID. ISID is 24 bit identifier that identifies service type. Traffic from leaf 1 and leaf 2 are given backbone destination address as root 1 and traffic from root 1 is given unicast backbone destination address of the leaves for unicast traffic and is given multicast backbone destination address derived from combination of OUI (organizationally unique identifier) and ISID for multicast traffic. The frames egressing from the BEB towards other BEBs within the PBB are further tagged with backbone VLAN ID (BVID). This BVID identifies the path taken by the P2MP within the PBB network. If a link along the path fails then the path restoration protocol will try to find another path to restore the P2MP service. Notice that each P2MP will be uniquely identified by a single ISID. We need only one BVID for many number of P2MP services. There are 16 million ISIDs and only 4096 VLAN IDs. Notice here we need only one backbone VLAN ID unlike in PBN where we needed two VLAN IDs per P2MP. Though we have saved the VLANs we cannot protect service failure from failure of root 1. PBB does not have a mechanism where leaves can switch to different root upon failure of original root.

In PBB-TE, the backbone edge bridges have capabilities in addition to that in PBB to support 1:1 protection switching between the two tunnels forming part of 1:1 protection switching mechanism. In PBB-TE a tunnel is identified by three identifiers (source backbone MAC address, destination backbone MAC address and backbone VLAN ID). A PBB-TE tunnel is provisioned end-to-end to transport data frames entering the BEBs. PBB-TE supports only 1:1 protection switching. In the FIG. 2 (as shown) two PBB-TE tunnels (work and protect). Upon failure of work, the traffic entering the BEBs are re-directed onto protect path. In PBB-TE tunnels terminate on the same BEBs, one on each point of the end-to-end transport. A work tunnel cannot be protected if end of the protect tunnel terminates on at least one different BEB. PBB-TE also supports P2MP service where there is one root and many leaves. Each leaf can communicate with the root and root can communicate with at least one leaf. If a root fails then there is failure of the P2MP service. PBB-TE does not have a mechanism to protect failure of root in P2MP service. Though, PBB-TE supports tunnel protection by switching from work to protect, the same mechanism cannot be extended to protect failure of roots in MRP2MP.

Therefore, to overcome the above restrictions it would be desirable to have a method and system to perform protecting of roots in a MRP2MP communication network.

SUMMARY OF THE INVENTION

An aspect of the present invention is to address at least the above-mentioned problems and/or disadvantages and to provide at least the advantages described below.

Accordingly, an aspect of the present invention is to provide a protection switching method for a Multi-Rooted Point-to-Multi-point Service in a Provider Backbone Bridge (PBB) network, the method comprising: assigning at least one communication device as Root node, a plurality of intermediate nodes and Leaf nodes; receiving, on at least one of the edge nodes (i.e. Root or leaf), the data packets from a client network interfacing with the PBB network; configuring all the communication edge devices to create a MAC-in-MAC data packet from the received data packet; configuring the Root node to add ISID R and leaf nodes to add ISID L in the I-tag of MAC-in-MAC data packets; determining a fault, if integrity check messages are not received in a predetermined time period between the Root node and the Leaf Nodes; and switching the traffic by changing the designated backbone destination MAC address of the MAC-in-MAC data packets from the present root node MAC address to other available superior root node MAC address; wherein switching is performed when integrity failure is detected, or upon network operator request.

In another aspect of the present invention is to provide a protection switching system for a Multi-Rooted Point-to-Multi-point Service in a Provider Backbone Bridge (PBB) network, the system comprising: a plurality of communication device which are interconnected logically to send and receive traffic on at least one port, wherein at least one communication device assigned as a Root node, a plurality of intermediate nodes and leaf nodes, wherein the Root node, intermediate nodes and the leaf nodes are configured for: receiving, on at least one of the edge nodes (i.e., root or leaf) the data packets from a client network interfacing with the PBB network; configuring all the communication edge devices to create a MAC-in-MAC data packet from the received data packet, wherein a MAC-in-MAC data packet has MAC-in-MAC header encapsulating the data packets received from the client network and wherein MAC-in-MAC header includes backbone source MAC address, backbone destination MAC address, B-tag and I-tag; configuring the Root node to add ISID R and leaf nodes to add ISID L in the I-tag of MAC-in-MAC data packets; determining a fault, if integrity check messages are not received in a predetermined time period between the Root node and the Leaf Nodes; and switching the traffic by changing the designated backbone destination MAC Address of the MAC-in-MAC data packets from the present root node MAC address to other available superior root node MAC address; wherein switching is performed when integrity failure is detected, or upon network operator request.

The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to a processing apparatus via a network connection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

A computer network is a geographically distributed collection of interconnected sub networks for transporting data between nodes (i.e., devices), such as intermediate nodes and end nodes. A local area network (LAN) is an example of such a sub-network, one or more LANs may be further interconnected by an intermediate network node, such as a router, bridge, or switch, to extend the effective "size" of the computer network and increase the number of communicating nodes.

Figure 1:
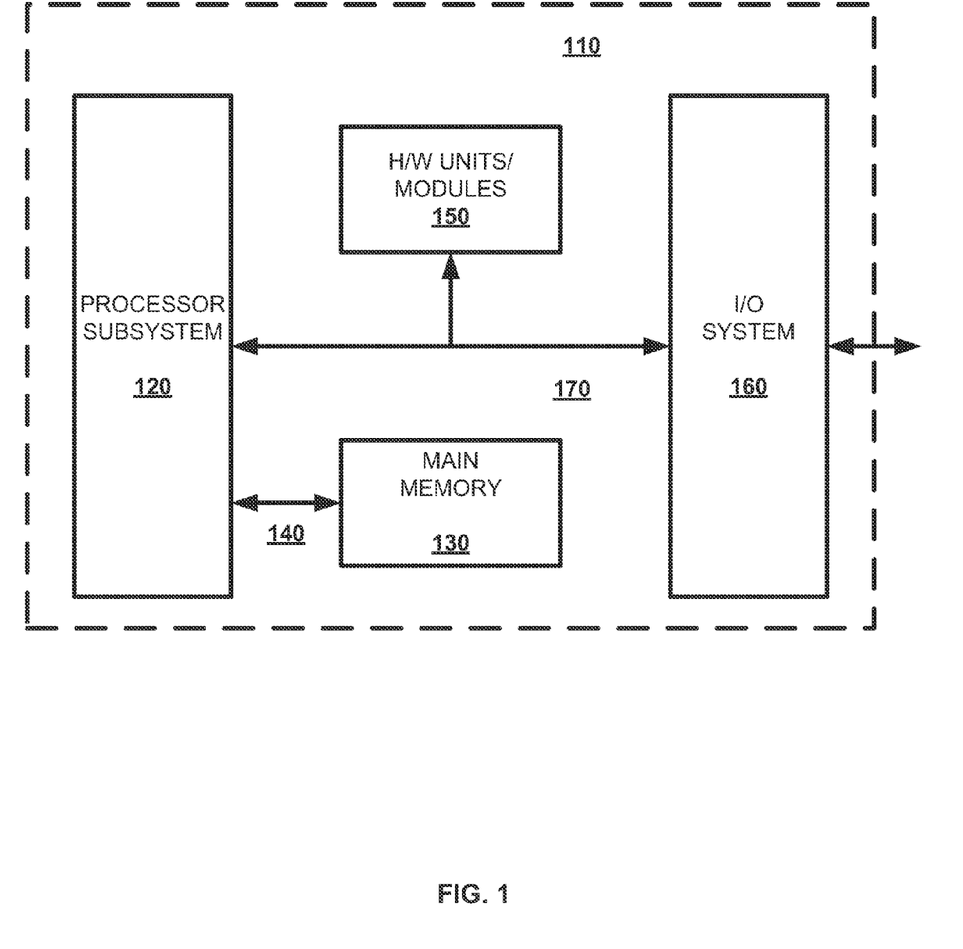
FIG. 1 is a generalized schematic block diagram of a network node.

As shown in FIG. 1, each node 110 typically comprises a number of basic subsystems including a processor subsystem 120, a main memory 130 and an input/output (I/O) subsystem 160. Data is transferred between main memory ("system memory") 130 and processor subsystem 120 over a memory bus 140, and between the processor and I/O subsystems over a system bus 170. Examples of the system bus may include the conventional lightning data transport (or hyper transport) bus and the conventional peripheral component (computer) interconnect (PCI) bus. Node 110 may also comprise other hardware units/modules 150 coupled to system bus 170 for performing additional functions. Processor subsystem 120 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

The term "packet," as used herein, may refer to a packet, a datagram, a frame, or a cell; a fragment of a packet, a fragment of a datagram, a fragment of a frame, a fragment of a cell; or another type, arrangement, or packaging of data.

However, persons having ordinary skill in the networking arts will appreciate that these specific details may not be needed to practice the present invention.

Figure 3:
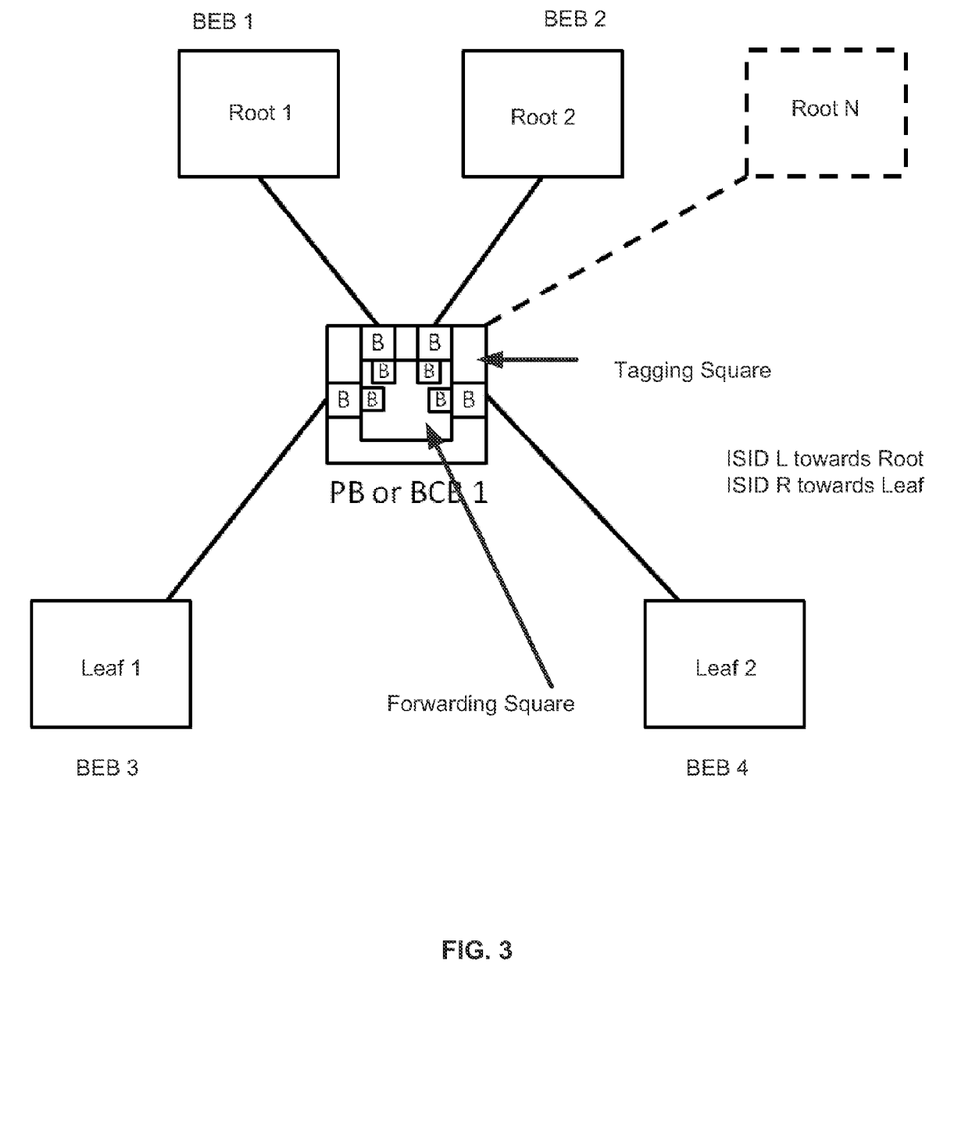
FIG. 3 shows a protection switching system for a Multi-Rooted Point-to-Multi-point Service in a Provider Backbone Bridge (PBB) network, according to one embodiment of the present invention.

FIG. 3 is a diagram of an exemplary protection switching system in a Multi-Rooted Point-to-Multi-point Service in a Provider Backbone Bridge (PBB) network according to one embodiment of the present invention. As illustrated, network may include one or more root nodes, and multiple leaf nodes (referred to herein collectively as "leaf nodes" or generically as "leaf node") interconnected in a network. Components of network may interconnect via wired and/or wireless connections.

For simplicity, one root node, two leaf nodes, and a provider backbone bridge network, have been illustrated in FIG. 3. In practice, there may be more root nodes, leaf nodes, provider networks, and/or root points. Also, in some instances, one or more of the components of network may perform one or more functions described as being performed by another one or more of the components of network. Although FIG. 3 illustrates exemplary network, in other implementations, network may include differently arranged components than those depicted in FIG. 3. Additionally, or alternatively, the connections between devices may be direct or indirect.

Root node and leaf nodes may be similarly configured devices that may serve as a root or leaf in a MEF E-Tree service. Root node and leaf nodes may include one or more data transfer devices, such as a switch, a gateway, a router, a firewall, a network interface card (NIC), a hub, a bridge, a proxy server, or some other type of device that processes and/or transfers data. For example, root node and leaf nodes may include routers that provide an entry to and/or an exit from provider network. Root node and leaf nodes may include measurement logic that measures latency, packet loss, jitter, and/or other parameters associated with routing data via provider network.

Root node and leaf nodes may transmit and receive data via any number of protocols, such as Ethernet, Frame Relay, asynchronous transfer mode (ATM), time division multiplexing (TDM), Internet protocol (IP), etc. In some implementations, root node and/or leaf nodes may be located at a demarcation point, such as in an Ethernet demarcation (ED) device, a network interconnection device (NID), or a managed media converter. In another implementation, root node and/or leaf nodes may be a provider edge (PE) device that routes data received from various devices, such as customer devices (not shown) provided outside of provider network, using multi-protocol label switching (MPLS). In this case, root node and/or leaf nodes may set up a label switching path (LSP) via provider network in which data forwarding decisions are made using an MPLS label, included with a data packet, to identify a next hop to which to forward the data.

Provider network may represent a network used to route customer data traffic to/from various devices in network. Provider network may include devices, systems, and/or protocols that provide switching and/or routing of packets. For example, provider network may include wide area network (WAN), such as the Internet, a private WAN, or a combination of the Internet and a private WAN. Provider network may include a number of devices and links that may be used to connect root node and leaf nodes. In an exemplary implementation, provider network may include a number of devices used to route data using MPLS. For example, provider network may include a Metro Ethernet (ME) network.

Root point may include a bridging point within a rooted-multipoint Ethernet virtual connection (EVC) of an ME network (e.g., provider network). Root point may be located within a node that may include one or more data transfer devices, such as a switch, a gateway, a router, a firewall, a NIC, a hub, a bridge, a proxy server, or some other type of device that processes and/or transfers data. Root point may function to transmit data between other network devices provided within provider network. As used herein, root point may be broadly construed to refer to a root (bridging) point or a node that includes a location of root point.

In implementations described herein, all communication devices including root node, intermediate nodes and leaf nodes checks for integrity of the root-to-leaf connection periodically. The integrity information like whether the root is reachable or not is available from integrity check messages like continuity check messages (IEEE 802.1ag. CFM) etc. The system receives on at least one of the edge nodes (i.e. root or leaf) the data packets from a client network interfacing with the PBB network. The system configures all the communication edge devices to create a MAC-in-MAC data packet from the received data packet, where creating a MAC-in-MAC data packet includes MAC-in-MAC header encapsulating the data packets received from the client network. The MAC-in-MAC header includes backbone source MAC address, backbone destination MAC address, B-tag and I-tag.

The system further configures the root node to add ISID R and leaf nodes to add ISID L in the I-tag of MAC-in-MAC data packets. Where 'R' denotes for 'used at Root' and 'L' denotes for 'used at Leaf Nodes'.

The system switches the traffic by changing the designated backbone destination MAC address of the MAC-in-MAC data packets from the present root node MAC address to other available superior root node MAC address, where switching may be performed when integrity failure is detected or upon network operator request.

In an example operation as shown in FIG. 2, root node and leaf nodes are backbone edge bridge (BEBs). For simplicity, the root nodes are assigned as Root 1 (BEB 1) and Root 2 (BEB 2) and the leaf nodes are assigned as Leaf 1 (BEB 3) and Leaf 2 (BEB 4).

When the traffic flows from leaf 1, leaf 1 will add backbone source MAC address as BEB 3 and backbone destination MAC address as BEB 1. Further leaf 1 will insert ISID R and BVID B. BCB receives the frame from leaf 1. If the MAC forwarding table in BCB is empty or does not have BEB 3 in its entry, then BCB will learn the backbone source MAC address and forward the frame on all ports, except the port from which the frame was received, that have matching BVID B on the egress port.

Leaf 2 when receives the frame with ISID L originated from Leaf 1, the Leaf 2 will discard the frame. Leaf 2 will accept only those frames for processing which have ISID R. Root 1 when receives the frame with ISID R originated from Leaf 1, the root node will accept the frame for processing because its port connected to BCB is configured to accept ISID L.

Unicast traffic from root 1 will add backbone source MAC address as BEB 1 and backbone destination as individual MAC address of the leaf to which the traffic is destined. Multicast traffic from root 1 will add backbone source MAC address as BEB 1 and backbone destination as group Mac address given by combination of OUI (organizational unique identifier) and ISID R.

Further the root 1 will insert ISID R and BVID B. BCB receives the frame from the root 1. If the MAC forwarding table in BCB does not have backbone source MAC address of root 1, then the BCB will learn it and forward the frame on all ports, except the port from which the frame was received, that have matching BVID B on the egress port. In case of unicast traffic leaf which was supposed to receive the frame will check for its MAC address and also for the ISID R in the frame. In case of multicast traffic all leaves will check for multicast MAC address given by combination of OUI and ISID R. If the check succeeds, then the frame will be accepted for further processing. Else the frame will be discarded. By using two ISIDs and single BVID one can achieve P2MP service provisioning. The feature of multi-rooted P2MP is provided by changing backbone destination MAC address. If root 1 is not reachable at the leaf, then leaf will use the backbone destination MAC address of next superior available root, say BEB 2 of root 2.

The system determines a fault, if integrity check messages are not received in a predetermined time period between the Root node and the Leaf Nodes in order to switch the traffic by changing the designated backbone destination MAC Address of the MAC-in-MAC data packets from the present root node MAC address to other available superior root node MAC address.

If the Leaf node receives any frame with ISID L, the leaf node drops/discards all. Leaf node is configured to insert ISID L towards root. Similarly, root is configured to insert ISID R towards leaves. In the FIG. 3, if root 1 is not reachable for any leaf, then destination address is changed from root 1 to root 2. In other words, the destination MAC address is changed to available superior root. BCB 1 is configured with BVID either automatically or manually in such a way that all BEBs are connected over the path represented by BVID B.

Figure 4:
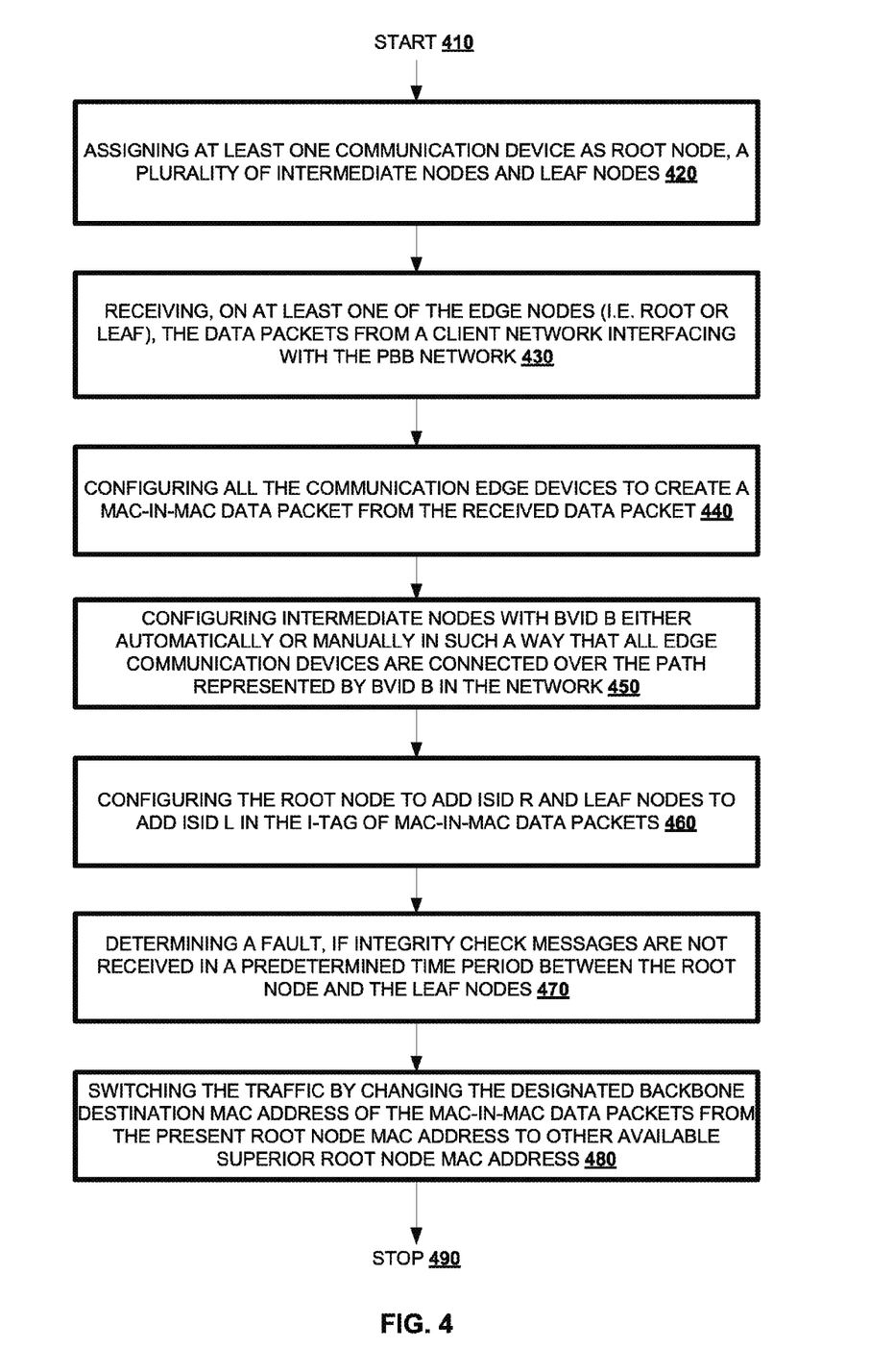
FIG. 4 shows a flowchart of a protection switching method for a Multi-Rooted Point-to-Multi-point Service in a Provider Backbone Bridge (PBB) network, according to one embodiment of the present invention.

FIG. 4 illustrates a flowchart of a protection switching method for a Multi-Rooted Point-to-Multi-point Service in a Provider Backbone Bridge (PBB) network which starts at step 410, according to one embodiment of the present invention.

At step 420, the method assigns one or more communication device as Root node, a plurality of intermediate nodes and Leaf nodes. At step 430, the method receives the data packets from a client network interfacing with the PBB network on at least one of the edge nodes (i.e. Root or leaf).

At step 440, the method is configures all the communication edge devices to create a MAC-in-MAC data packet from the received data packet, where the MAC-in-MAC data packet includes MAC-in-MAC header encapsulating the data packets received from the client network. The MACin-MAC header includes backbone source MAC address, backbone destination MAC address, B-tag and I-tag.

At step 450, the method configures intermediate nodes with BVID B either automatically or manually in such a way that all edge communication devices are connected over the path represented by BVID B in the network.

At step 460, the method also configures the Root node to add ISID R and leaf nodes to add ISID L in the I-tag of MAC-in-MAC data packets. The leaf nodes drop or discards all packets received with ISID L in the frame or packet, and where the leaf node receives or accepts or processes MAC-in-MAC data packets with ISID R and root node receives or accepts or processes MAC-in-MAC data packets with ISID L.

At step 470, the method checks for a fault, the checking of fault is done by verifying if integrity check messages are not received in a predetermined time period between the Root node and the Leaf Nodes.

At step 480, the method switches the traffic by changing the designated backbone destination MAC address of the MAC-in-MAC data packets from the present root node MAC address to other available superior root node MAC address, wherein switching is performed when integrity failure is detected, or upon network operator request, and stops at step 490.

FIGS. 1-4 are merely representational and are not drawn to scale. Certain portions thereof may be exaggerated, while others may be minimized. FIGS. 1-4 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A root failure protection method for a Multi-Rooted Point-to-Multi-point Service in a Provider Backbone Bridge (PBB) network, the PBB Network arranged as Point-to-Multipoint tree, the Point-to-Multipoint tree including a root node communicatively coupled to a plurality of intermediate nodes and leaf nodes, the method comprising:

receiving, on at least one of edge nodes, customer data packets from a client network interfacing with the PBB network, wherein the root node and the leaf nodes constitute the edge nodes;

configuring all communication edge devices to create a MAC-in-MAC data packet from the received customer data packets, wherein the MAC-in-MAC data packet comprises a MAC-in-MAC header, encapsulating the customer data packets received from the client network and wherein the MAC-in-MAC header comprises a backbone source MAC address, a backbone destination MAC address, a B-tag and an I-tag, a B-VID field of B-Tag is B-VID B;

configuring the root node to add ISID R and leaf nodes to add ISID L in the I-tag of the MAC-in-MAC data packets;

determining a fault in reaching the root node from one or more leaf nodes, if integrity check messages are not received in a predetermined time period between the root node and the leaf nodes; and switching traffic by changing designated backbone destination MAC address of the MAC-in-MAC data packets from present root node MAC address to other available superior root node MAC address, wherein switching is performed when the fault in reaching the root node is detected, or upon network operator request.

2. The method of claim 1, wherein the leaf nodes drop or discard all data packets received with ISID L in frame or packet, and wherein the leaf nodes receive or accept or process the MAC-in-MAC data packets with ISID R and the root node receives or accepts or processes MAC-in-MAC data packets with ISID L.

3. The method of claim 1, wherein the plurality of intermediate nodes are configured with BVID B either automatically or manually in such a way that all the communication edge devices are connected over a path represented by BVID B in the network.

4. The method of claim 1, wherein the plurality of intermediate nodes receives a frame from one or more of the edge nodes, wherein the plurality of intermediate node checks for MAC forwarding table is empty or if edge node MAC address is registered in order to learn backbone Source MAC address and forward the frame on all available ports except the port from which the frame was received which matches BVID on egress port.

5. The method of claim 1, wherein if the traffic between the root node and the leaf nodes are unicast, the root node will add backbone Destination MAC address as MAC address of the leaf node to which traffic is destined.

6. The method of claim 1, wherein if the traffic between the root node and the leaf nodes are multicast, the root node will add backbone Destination MAC address as Group MAC address of the leaf nodes, wherein the Group MAC address is combination of OUI and ISID R.

7. A root failure protection system for a Multi-Rooted Point-to-Multi-point Service in a Provider Backbone Bridge (PBB) network, the system comprising:

a plurality of communication device which are interconnected logically to send and receive traffic on at least one port, wherein at least one communication device assigned as a root node, a plurality of intermediate nodes and leaf nodes, the root node and leaf nodes constituting edge nodes, wherein the root node, the plurality of intermediate nodes and the leaf nodes are configured for:

receiving, on at least one of edge nodes, customer data packets from a client network interfacing with the PBB network;

configuring all communication edge devices to create a MAC-in-MAC data packet from the received customer data packet, wherein the MAC-in-MAC data packet comprises a MAC-in-MAC header encapsulating the customer data packets received from the client network and wherein the MAC-in-MAC header comprises a backbone source MAC address, a backbone destination MAC address, a B-tag and an I-tag a B-VID field of B-Tag is B-VID B;

configuring the root node to add ISID R and the leaf nodes to add ISID L in the I-tag of the MAC-in-MAC data packets;

determining a fault in reaching the root node from one or more leaf nodes, if integrity check messages are not received in a predetermined time period between the root node and the leaf nodes; and switching traffic by changing designated backbone destination MAC address of the MAC-in-MAC data packets from present root node MAC address to other available superior root node MAC address, wherein switching is performed when the fault in reaching the root node is detected, or upon network operator request.

8. The system of claim 7, wherein the leaf nodes drop or discard all the data packets received with ISID L in the packet, and wherein the leaf nodes receive or accept or process the MAC-in-MAC data packets with ISID R and the root node receives or accepts or processes the data packets with ISID L.

9. The system of claim 7, wherein configuring a BVID is either automatically or manually in such a way that all the communication edge devices are connected over a path represented by BVID B in the network.

10. The system of claim 7, wherein the communication device is a switch, a router, a gateway, a network interface card (NIC), a hub, a bridge, or a proxy server, and wherein the Root node and the leaf nodes are Backbone Edge Bridges (BEBs) and the plurality of intermediate nodes are Backbone Core Bridges (BCBs).

* * * * *